US008275652B2

(12) United States Patent
Hafeman et al.

(10) Patent No.: US 8,275,652 B2
(45) Date of Patent: Sep. 25, 2012

(54) METHOD FOR ESTABLISHING A PERSON AS A USER IN A SYSTEM

(75) Inventors: Joseph E. Hafeman, Holliston, MA (US); Louis Iannucci, Hudson, MA (US); Mark Melfi, Franklin, MA (US); Carl Shippee, Framingham, MA (US); Rajandra Laxman Kulkarni, Burlington, MA (US)

(73) Assignee: FMR LLC, Boston, MA (US)

( * ) Notice: Subject to any disclaimer, the term of this patent is extended or adjusted under 35 U.S.C. 154(b) by 320 days.

(21) Appl. No.: 12/267,344

(22) Filed: Nov. 7, 2008

(65) Prior Publication Data

US 2009/0113518 A1   Apr. 30, 2009

Related U.S. Application Data

(63) Continuation of application No. 10/923,981, filed on Aug. 23, 2004, now abandoned.

(51) Int. Cl.
G06Q 30/00 (2006.01)

(52) U.S. Cl. ............ 705/8; 705/9; 705/35; 705/36

(58) Field of Classification Search ............ 705/8, 9, 705/35, 36
See application file for complete search history.

(56) References Cited

U.S. PATENT DOCUMENTS

| 5,590,037 A | 12/1996 | Ryan et al. ............ 395/204 |
| 5,600,554 A | 2/1997 | Williams ............ 395/201 |
| 5,742,504 A | 4/1998 | Meyer et al. ............ 364/188 |
| 5,842,193 A | 11/1998 | Reilly ............ 706/45 |
| 5,941,947 A | 8/1999 | Brown et al. ............ 709/225 |
| 5,966,715 A | 10/1999 | Sweeney et al. ............ 707/203 |
| 5,974,412 A | 10/1999 | Hazlehurst et al. ............ 707/3 |
| 5,983,227 A | 11/1999 | Nazem et al. ............ 707/10 |
| 5,987,480 A | 11/1999 | Donohue et al. ............ 707/501 |
| 6,016,394 A | 1/2000 | Walker ............ 395/701 |
| 6,026,433 A | 2/2000 | D'Arlach et al. ............ 709/217 |
| 6,097,382 A | 8/2000 | Rosen et al. ............ 345/326 |
| 6,122,741 A | 9/2000 | Patterson et al. ............ 713/200 |
| 6,212,178 B1 | 4/2001 | Beck et al. ............ 370/352 |
| 6,401,079 B1 | 6/2002 | Kahn et al. ............ 705/30 |
| 6,430,542 B1 | 8/2002 | Moran ............ 705/36 R |
| 6,601,233 B1 | 7/2003 | Underwood ............ 717/102 |
| 6,684,369 B1 | 1/2004 | Bernardo et al. ............ 715/513 |
| 2001/0037223 A1 | 11/2001 | Beery et al. ............ 705/4 |
| 2002/0019974 A1 | 2/2002 | Iizuka ............ 717/107 |
| 2002/0022982 A1 | 2/2002 | Cooperstone et al. ............ 705/7 |
| 2002/0049617 A1 | 4/2002 | Lencki et al. ............ 705/4 |
| 2002/0069077 A1 | 6/2002 | Brophy et al. ............ 705/1 |
| 2002/0072830 A1 | 6/2002 | Hunt ............ 701/1 |
| 2002/0078103 A1 | 6/2002 | Gorman et al. ............ 707/530 |

(Continued)

OTHER PUBLICATIONS

Administering Enterprise User Security, Oracle9i Security Overview, Release 2 (9.2), Part No. A96582-01, http://www.csis.gvsu.edu/GeneralInfo/Oracle/network.920/a96582/entusers.htm.
Retrieved on Aug. 3, 2003 (4 pages).

(Continued)

Primary Examiner — Nga B. Nguyen
(74) Attorney, Agent, or Firm — Proskauer Rose LLP

(57) ABSTRACT

Dependents of benefit plan participants can be given access to personal information of a plan participant. The dependents, who are not existing users or members of the plan, can be allowed access to some or all of the personal information associated with the plan participant.

18 Claims, 7 Drawing Sheets

U.S. PATENT DOCUMENTS

| | | | | |
|---|---|---|---|---|
| 2002/0091702 | A1 | 7/2002 | Mullins | 707/100 |
| 2002/0092004 | A1 | 7/2002 | Lee et al. | 717/140 |
| 2002/0095571 | A1 | 7/2002 | Bradee | 713/164 |
| 2002/0099659 | A1 | 7/2002 | Swentor | 705/44 |
| 2002/0103680 | A1 | 8/2002 | Newman | 705/4 |
| 2002/0111946 | A1 | 8/2002 | Fallon | 707/9 |
| 2002/0129034 | A1 | 9/2002 | Woehl | 707/103 |
| 2002/0133392 | A1 | 9/2002 | Angel et al. | 705/10 |
| 2002/0161766 | A1 | 10/2002 | Lawson et al. | 707/9 |
| 2002/0184610 | A1 | 12/2002 | Chong et al. | 717/109 |
| 2003/0037263 | A1 | 2/2003 | Kamat et al. | 713/202 |
| 2003/0055868 | A1 | 3/2003 | Fletcher et al. | 709/201 |
| 2003/0069780 | A1 | 4/2003 | Hailwood et al. | 705/10 |
| 2003/0074342 | A1 | 4/2003 | Curtis | 707/1 |
| 2003/0078960 | A1 | 4/2003 | Murren et al. | 709/203 |
| 2003/0088443 | A1 | 5/2003 | Majikes et al. | 705/4 |
| 2003/0105692 | A1 | 6/2003 | Gilbert et al. | 705/35 |
| 2003/0115463 | A1* | 6/2003 | Wheeler et al. | 713/170 |
| 2003/0191703 | A1* | 10/2003 | Chen et al. | 705/36 |
| 2004/0117358 | A1 | 6/2004 | von Kaenel et al. | 707/3 |
| 2004/0139030 | A1 | 7/2004 | Stoll | 705/75 |
| 2005/0004895 | A1 | 1/2005 | Schurenberg et al. | 707/3 |
| 2005/0267847 | A1 | 12/2005 | Blechman | 705/75 |
| 2005/0273346 | A1 | 12/2005 | Frost | 705/1 |
| 2006/0021011 | A1* | 1/2006 | Kaplan | 726/5 |

OTHER PUBLICATIONS

BEA Systems—Solutions, http://bea.com/framework.jsp?CNT=solution.htm&FP=/content/solutions/technical/portal/. Retrieved on Aug. 3, 2003 (1 page).

bmcsoftware Control-SA®, http://bmc.com/offers/campaign/security/control_sa/. Retrieved on Aug. 3, 2003 (2 pages).

DataMirror : Products, http://datamirror.com/products/. Retrieved on Aug. 3, 2003 (2 pages).

Fernandez et al., Overview of Strudel—A Web-Site Management System (26 pages).

Genesys Internet Contact Solution, http://www.genesyslab.com/contact_center/products/internet_contact.asp. Retrieved on Aug. 7, 2003 (3 pages).

IBM AIX, Tivoli and the RS/6000 SP white, http://www-1.ibm.com/servers/aix/products/ibmsw/system_man/sptivoliwp.html. Retrieved on Aug. 3, 2003 (3 pages).

Impact Technologies Integrated Identity Management, http://impact-tech.com/html/integrated_identity_management.html. Retrieved on Aug. 3, 2003 (4 pages).

Integrate Your Enterprise, Enabling Web Services-Based Integration (WBSI), http://www.webmethods.com/integrate_your_enterprise/1.2565,WebServices,00.html. Retrieved on Aug. 3, 2003 (3 pages).

Internetweek.com, Net News : Web Workflow Takes Hold, http://www.internetweek.com/cwi/netnews/081197/news0815-4.html. Retrieved on Dec. 19, 2003 (2 pages).

Momentum Software, B2B Integration with Web Services, http://www.momentumsoftware.com/services/enterppriseSolutions/webServicesEnterprise.shtml. Retrieved on Aug. 3, 2003 (1 page).

Momentum Software, Portals & Content Management, http://www.momentumsoftware.com/services/enterpriseSolutions/portals.shtml. Retrieved on Aug. 3, 2003 (2 pages).

PeopleSoft : Enterprise Solutions—PeopleSoft HRMS, http://webarchive.org/web/19980630020850/http://www.peoplesoft.com/products_and_services/ent . . . Retrieved on Dec. 11, 2003 (5 pages).

People Support, Savvy eReps™ with multiple capabilities, http://peoplesupport.com/chat.asp. Retrieved on Aug. 7, 2003 (1 page).

Putting XML to Work, Jul. 1998, http://web.archive.org/web/1999012803814/www.interleaf.com/ecmwp.html. Retrieved on Dec. 11, 2003 (9 pages).

Siebel Systems—Siebel eCollaboration—Product Description, http://www.siebel.com/products/service/web_service/ecollab/product_module_desc.shtm. Retrieved on Aug. 7, 2003 (2 pages).

Single Sign-On, Security, eTrust Single Sign-On, http://www3.ca.com/Solutions/Product.asp ?ID=166. Retrieved on Aug. 3, 2003 (1 page).

Synygy's Enterprise Performance Management (EPM) Product Line, http://sysnygy.com/solutions/epm.html. Retrieved on Aug. 11, 2003 (2 pages).

Synygy EPM™ Software (2 pgs)., http://www.synygy.com/solutions/epm_software.html. Retrieved on Aug. 11, 2003 (2 pages).

Teradata CRM, Customer Relationship Management (4 pages).

Teradata CRM Touchpoint Server, Customer Relationship Management (2 pages).

The CRM Project, Teradata, Growing Your Business with Teradata CRM, http://crmproject.com/documents.asp ?d_ID=1394. Retrieved on Aug. 7, 2003 (5 pages).

The Workflow Process : Dynamic Site Design and Maintenance, Seybold San Francisco '97, http://seminars.seyboldreports.com/1997_san_francisco/22.html. Retrieved on Apr. 23, 2004 (27 pages).

Waveset Secure identity management solutions, http://www.waveset.com/Solutions/Lighthouse/index.html. Retrieved on Aug. 3, 2003 (2 pages).

Office Action of Feb. 12, 2008 received in U.S. Appl. No. 10/923,981.

* cited by examiner

Dependents

Print this Page

Review the information below for accuracy. If you need to make any changes to your dependent information, click Update.

Important: To add or drop a dependent to this year's benefits, go to Life Events. —140
—725   —705

| Jane Doe —125 | | Update —720 |
|---|---|---|
| SSN | 000-00-0001 | |
| Relationship | Spouse —125 | |
| Date of Birth | 05/09/1959 —710 | |
| Student | Non-Student | |
| Gender | Female | |
| Address | Same As Employee —715 | |

—730

—735

| John Doe Jr. —145 | | Update |
|---|---|---|
| SSN | 111-11-1111 | |
| Relationship | Child | |
| Date of Birth | 08/09/1982 | |
| Student | Full Time Student | |
| Gender | Male | |
| Address | Same As Employee | |

- Overview
- Messages

Enrollment
- Life Events

My Health & Insurance
- What's New
- Current Benefits
- Reimbursement Plan

My Profile
- Personal Information
- Dependents

Health Resources
- Health & Insurance Forms —735'
- Reference Library
- Provider Directory
- Carrier Web Sites
- Contacts
- Health Management Center

METHOD FOR ESTABLISHING A PERSON AS A USER IN A SYSTEM

RELATED APPLICATION

This application is a continuation of U.S. Ser. No. 10/923,981, filed on Aug. 23, 2004, the entire disclosure of which is incorporated by reference herein.

TECHNICAL FIELD

The invention generally relates to providing third-party access to employee benefit information.

BACKGROUND INFORMATION

Families often have two working parents and a wealth of options when it comes to retirement saving plans, medical plans, and life insurance policies. Many families delegate the management of these plans to one family member who, in some cases, may not be the plan participant. As more and more families gain access to the world wide web, Human Resource (HR) portals are becoming a popular means for employers and employee benefit plan providers to communicate and interact with employees and plan participants. By providing a single point of entry into numerous applications for employees and plan participants, HR portals enhance the accessibility of personal information, reduce call center volume, and allow for frequently asked questions to be investigated and answered by the plan participants themselves.

HR portals allow users to perform functions such as changing addresses stored in the database, requesting Personal Identification Numbers for access to accounts, or changing the asset allocations in a 401(k) plan.

SUMMARY OF THE INVENTION

The present invention relates to providing dependents and other authorized individuals access to the personal information of a participant of one or more employee benefit plans. More particularly, the invention relates to a software application that allows one or more non-plan participants (e.g., dependents of a plan participant such as the participant's children, spouse, elderly relatives, beneficiaries, or agents of the plan participants such as a stock broker) to access some (or all) data particular to a certain participant, without requiring that the non-participant be previously identified as a user of the software application or as a participant in the same benefit plan(s).

HR portals have put account control into the hands of the plan participants, but portals have limitations. Dependents or agents of the participants generally cannot view or modify information that may be relevant to them. A dependent wishing to change personal information such as their mailing address generally must request the plan participant to make the change on their behalf. Furthermore, a dependent (such as a wife or husband) charged with managing the family finances is usually not permitted to assume the identity of the plan participant to update investment options or review healthcare data. Providing the dependent with the participant's username and password, (and thereby giving the dependent unfettered control over a participant's accounts) introduces security risks. Therefore, a need exists to allow plan participants to grant certain non-participants (such as their dependents and/or agents) electronic access to the participants personal information where the non-participants may not previously have been identified to the software application(s) used to administer the benefit plans.

The invention facilitates access to data through a secure system such that users previously unidentified to the system can access a plan participant's personal information at the request of the participant. Additionally, to address potential changes in the participant/non-participant relationship, access privileges may also be revoked or modified by the participant as he or she sees fit.

In one aspect, the invention provides a method of authorizing access to personal data. The method includes (i) obtaining, by a first person via a software application, access to personal information attributed to the first person; (ii) providing the identity of a second person to the application, the second person's identity being previously unknown to the application; and (iii) providing, to the software application, a relationship between the first person and the second person.

In some embodiments, the first person further provides parameters defining the second person's access privileges to the personal information attributed to the first person, and, in some cases the parameters are based on the relationship provided by the first person. In some embodiments, the software application facilitates the operation of one or more employee benefit programs. Employee benefit programs may be human resource programs, defined contribution programs, defined benefits programs, workplace savings programs, medical savings programs, or payroll programs. In some embodiments, access to the personal information is obtained via an electronic communications network. An electronic communications network including one or more of the following: a local area network, a wide area network, an intranet, or the Internet.

In some embodiments, the first person is required to provide user authentication information prior to obtaining access to the personal information. User authentication information may be a user name, a password, a social security number, an employee number, a client number, biometric information, or any combination thereof. Additionally, in some embodiments, the personal information attributed to the participant may be financial information, beneficiary information, or healthcare information.

In some embodiments, the second person is a dependent of the first person. A dependent may be a wife, a husband, a child, or parent of the first person. In other embodiments, the second person is an agent of the first person such as an attorney, a guardian, a beneficiary, an executor, an accountant, or a financial planner.

In some embodiments, the identity of the second person is provided over an electronic communications network as described above (e.g., the Internet). In other embodiments, the identity of the second person is provided via a telephone. In still other embodiments, the identity of the second person is provided via a customer service representative. These examples, however, do not limit the available channels through which the second person's identity may be provided.

The second person's access privileges to the first person's personal information can be defined through parameters. These parameters can include limiting the second person's access to a subset of the first person's personal information. The subset of the personal information can be based on date restrictions applied to the personal information or, alternatively, based on data type restrictions applied to the personal information. The data type restrictions can be based at least in part on the relationship between the first person and the second person. Additionally, in some embodiments, operative restrictions may be provided, which define the functions within the software application that are available to the second person. As with data type restrictions, these operative restrictions can based at least in part on the relationship between the first person and the second person. Additionally, parameters defining the second person's access privileges may be provided which modify, or even revoke, the second person's access to the personal information.

In another aspect of the invention, a method of allowing access to personal information includes (i) allowing, via a software application, a first person access to personal information attributed to the first person; (ii) receiving the identity of a second person from the first person, the identity of the second person being previously unknown to the application; and (iii) receiving, from the first person via the software application, parameters defining the relationship between the first person and the second person.

In some embodiments, the method further comprises receiving, from the first person and via the software application, parameters defining the second person's access privileges to the personal information attributed to the first person. The indication of the relationship may, in some cases, further define the second person's access privileges.

In some embodiments, the software application facilitates the management of one or more employee benefit programs. The employee benefit programs may be human resource programs, defined contribution programs, defined benefits programs, workplace savings programs, medical savings programs, or payroll programs.

In some embodiments, access to the personal information attributed to a first person is obtained via an electronic communications network, which again may be one, or a combination, of: a local area network, a wide area network, an intranet, or the Internet. The personal information may be stored in one or more database modules.

In one embodiment, the invention receives user authentication information from the first person before providing access to his or her personal information. The user authentication information may be a user name, a password, a social security number, an employee number, a client number, biometric information, or a combination thereof. Additionally, in some embodiments, the personal information attributed to the first person may be financial information, beneficiary information, or healthcare information.

After the user authentication information is received, the identity of a second person and his relationship to the first person are received. In some embodiments, the second person is a dependent of the first person. A dependent may be a wife, a husband, a child, or parent of the first person. In other embodiments, the second person is an agent of the first person such as an attorney, a guardian, a beneficiary, an executor, an accountant, or a financial planner.

In some embodiments, the identity of the second person is received over an electronic communications network as described above (e.g., the Internet). In other embodiments, the identity of the second person is received via a telephone. In still other embodiments, the identity of the second person is received via a customer service representative. These examples, however, do not limit the available channels that the second person's identity is received through.

The second person's access privileges to the personal information can be defined through parameters. These parameters may include limiting the second person's access to a subset of the personal information. This subset of the personal information may be based on date restrictions applied to the personal information or, alternatively, based on data type restrictions applied to the personal information. The data type restrictions are based at least in part on the relationship between the first person and the second person. Additionally, in some embodiments, operative restrictions may be provided which define the functions within the software application available to the second person. These operative restrictions are based at least in part on the relationship between the first person and the second person. Additionally, parameters defining the second person's access privileges may be received, which modify, or even revoke, the second person's access to the personal information.

In yet another aspect, the invention provides a computerized system for allowing access to personal information. This system includes (i) one or more data storage modules for storing personal information attributed to a first person using the system; (ii) a security module in electronic communication with the data storage module(s) for determining a subset of the personal information attributed to the first person; and (iii) a communication module in electronic communication with the data storage module(s) and the security module for receiving electronic communications from the first person. The communications include instructions to grant or modify a second person access to the subset of the personal information attributed to the first person, wherein the identity of the second person has not been previously provided to the system.

The personal information stored by the system may comprise a relationship between the first person and the second person. Additionally, the second person's access can be based, at least in part, on the relationship between the first person and the second person.

The system can include one or more data publishing modules for publishing data stored in the data storage modules. In one version, the data publishing modules publish the stored data using web services. In this version, and others, the web services provide the data in an XML format. The XML format can also be deployed as a data feed that may be emailed or placed in a repository such as a File Transfer Protocol server.

The software application can facilitate the administration of one or more employee benefit programs such as human resource programs, defined contribution programs, defined benefits programs, workplace savings programs, medical savings programs, or payroll programs.

In some embodiments, the system includes a content module in electronic communication with both the communication module and the data storage modules. The content module provides text and images ("content") for the software application. The content served by the content module may be stored as static HTML files or may be transmitted as HTML files that are assembled from one or more sections of text and/or data stored in the data storage modules.

Some embodiments also include an authentication module for receiving user authentication information from the first user of the software application. The user authentication information may be a user name, a password, a social security number, an employee number, a client number, biometric information, or a combination thereof.

Still another aspect of the invention is a computerized system for allowing access to personal data. The system includes: (i) means for providing access to a set of data to a first person (a user of a software application), the set of data including personal information attributed to the first person; (ii) means for receiving from the first person, the identity of a second person, wherein the identity of the second person had not been previously provided to the software application; and (iii) means for receiving, from the first person, parameters defining a subset of the set of data to which the second person may have access. The system further includes means for providing, via the software application, parameters defining a subset of the set of data to which the second person may have access. In some embodiments, the parameters received define the second person's access and are based, at least in part, on the relationship between the first person and the second person. In some embodiments, the parameters received define the second person's access privileges to the personal information. In some of these embodiments, the parameters received modify or revoke the second person's access privileges.

BRIEF DESCRIPTION OF THE DRAWINGS

These and other aspects of the present invention, as well as the invention itself, will be more fully understood from the detailed description below and the appended drawings, which are meant to illustrate and not limit the invention, and in which:

FIG. 7 depicts one possible implementation of a data screen of an HR portal where dependent information is displayed to the user.

DESCRIPTION

The invention relates to computer-based systems and methods that provide access to personal information for one or more dependents or agents of a participant in an employee benefit plan. In accordance with the invention, a software application allows one or more dependents or agents identified by a plan participant to access some (or all) personal information particular to that participant, even if the dependents or agents are not previously identified as users of the software application or participants in the benefit plan.

Figure 1:
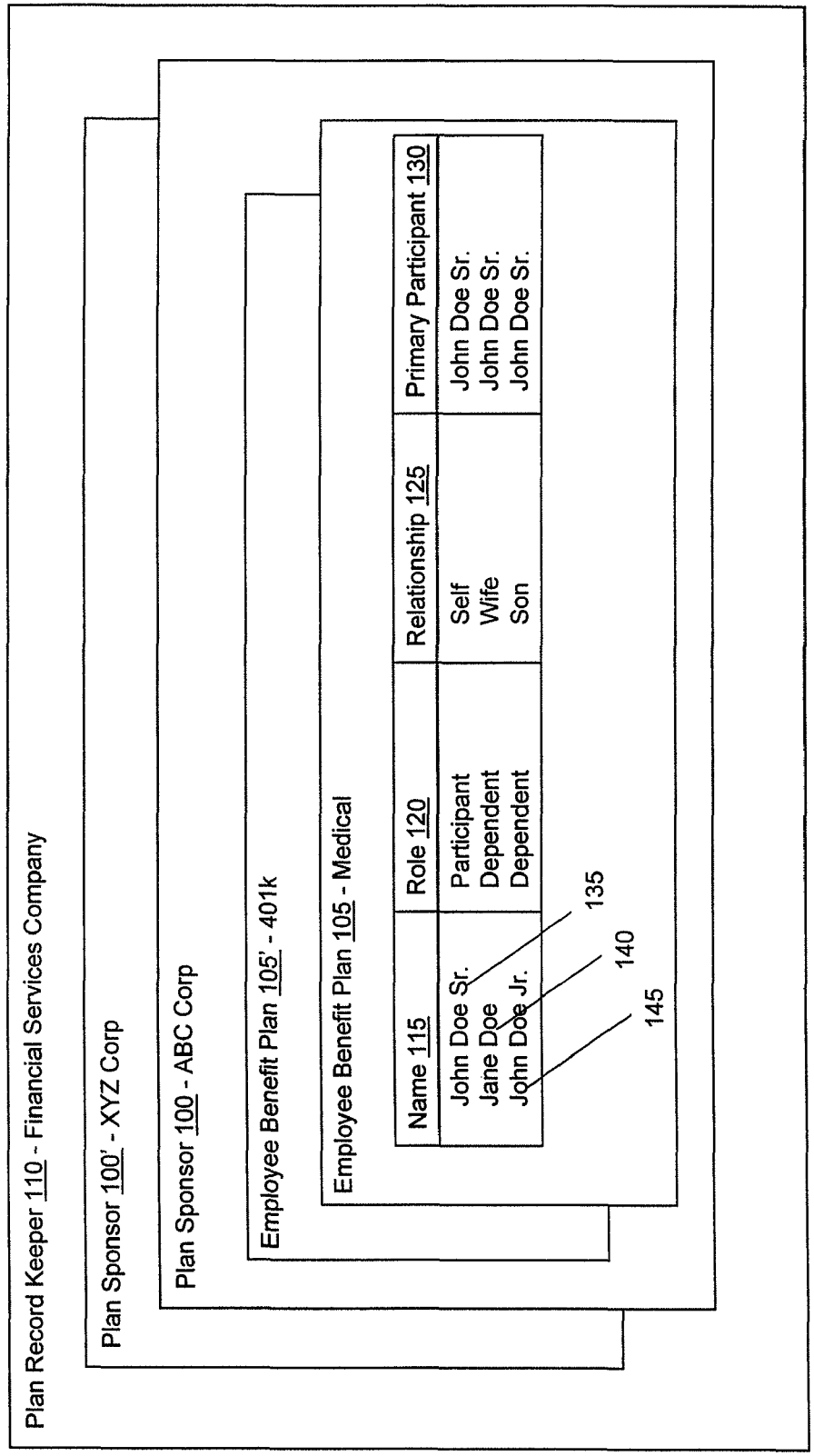
FIG. 1 illustrates an environment in which the systems and methods of the invention can operate.

FIG. 1 depicts the relationships among plan sponsors, employee benefit plans, and plan participants in accordance one embodiment of the present invention. In one embodiment, a plan sponsor ("sponsor") 100 provides one or more employee benefit plans ("plans") such as medical plans 105, or 401(k) plans 105' (together 105), to its employees. The employees that participate in one, some, or all of these plans can be referred to as participants. Because of the significant overhead and regulatory requirements involved in the development and record keeping for the plans 105, many plan sponsors 100 contract with a plan record keeper ("record keeper") 110 to provide these services. Examples of record keepers 110 include financial services companies such as banks, brokerage houses, insurance companies, and individual financial advisors, as well as data processing companies. In some cases, the record keeper 110 may act as a plan administrator as defined by ERISA and have fiduciary responsibilities toward the plan sponsor. In some cases, record keepers 110 provide these services to numerous plan sponsors 100.

For example, a record keeper 110 may offer various plans 105 to one, or more sponsors 100 such as large public corporations with thousands of employees. The plans 105 may include a defined contribution plan such as a 401(k) or 403(b) plan, a defined benefit plan such as a pension plan, a deferred compensation plan such as a 457 plan, and a health and welfare plan such as medical or dental insurance plan. Some of the data used to facilitate the record keeping activities supporting the plans 105 includes attributes of plan participants such as their name, social security number, and address. Because some plans require the identification of one or more beneficiaries or provide benefits to individuals related to the plan participant, data such as the name 115 of the person related to the participant, their role in the system 120, their relationship 125 to the participant, and an identification 130 of the primary plan participant to whom they are related is also captured. For example, John Doe Sr. 135 is an employee of plan sponsor ABC Corp. 100 and participates in a medical plan 105 provided by ABC Corp. Because he is the primary plan participant his role is characterized as a "participant." Jane Doe 140, however, has an identified role 120 of "dependent" (e.g., she is covered by the medical plan in which her husband John participates, is a beneficiary of a retirement plan, etc.) and therefore is assigned a relationship 125 of "wife" of the primary participant "John Doe," indicating her relationship with her husband. Other possible examples include dependent children and children managing retirement accounts for elderly parents, among others. These attributes are exemplary only and one skilled in the art would be able to tailor plan and member attributes to suit a variety of benefit plans and relationships among the participants.

Figure 2:
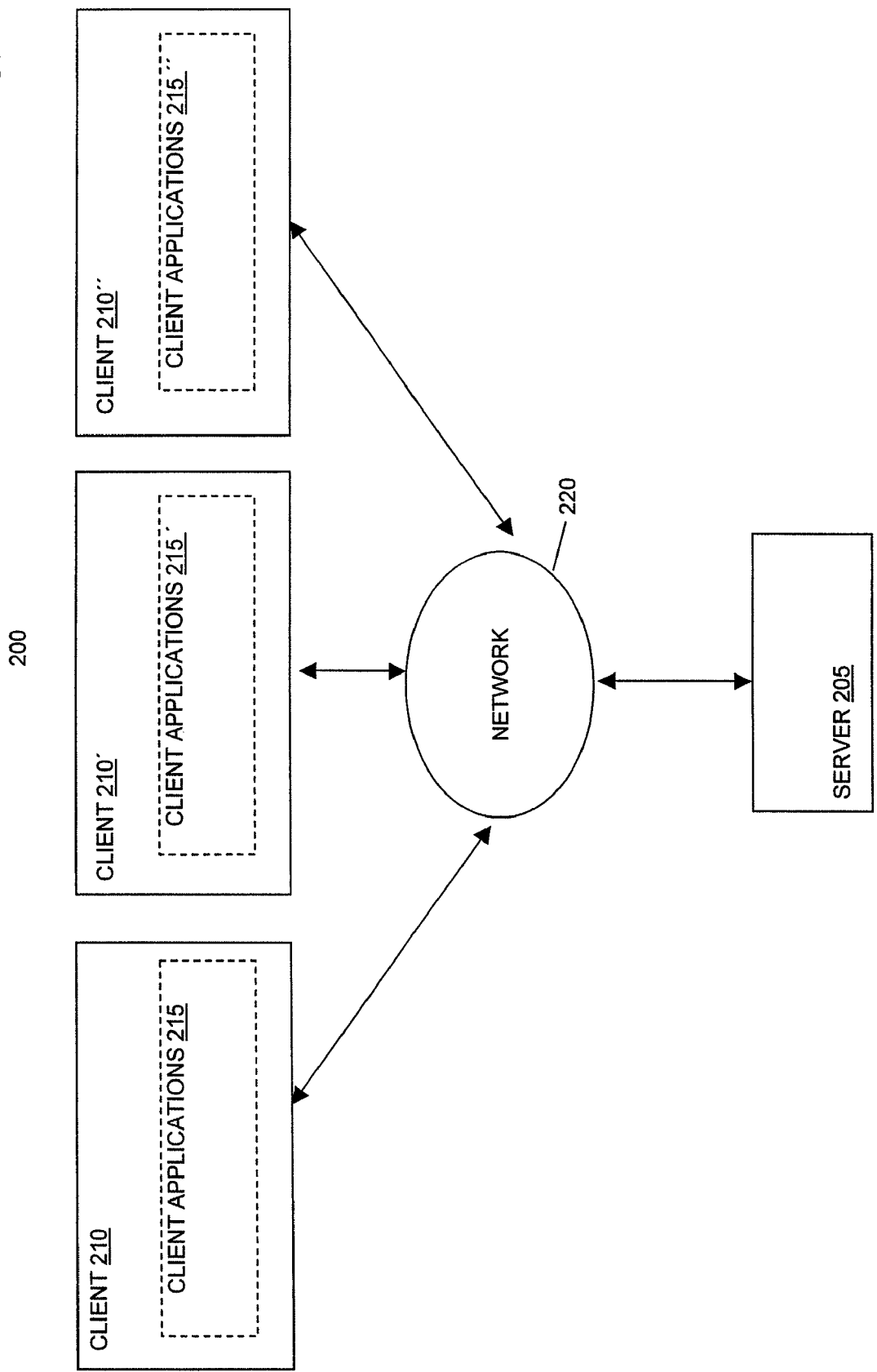
FIG. 2 is a network diagram in accordance with one embodiment of the invention.

Referring now to FIG. 2, in one embodiment, a system for allowing a participant to grant access to his or her personal information to a dependant or agent is provided. The system may be implemented using a production system 200 including at least one server 205, and at least one client 210, 210', and 210", generally 210. As shown, the system 200 includes three clients 210, 210', 210", but this is only for exemplary purposes, and it is intended that there may be any number of clients 210. The client 210 can be implemented as software running on a personal computer (e.g., a PC with an Intel processor or an Apple Macintosh) capable of running an operating system such as one of the Microsoft Windows family of operating systems from Microsoft Corporation of Redmond, Wash., the Macintosh operating system from Apple Computer of Cupertino, Calif., and various varieties of Unix, such as Sun Solaris from Sun Microsystems, and Linux from Red Hat, Inc. of Durham, N.C. (and others). The client 210 could also be implemented on such hardware as a smart or dumb terminal, network computer, personal data assistant, wireless device, information appliance, workstation, minicomputer, mainframe computer, kiosk, or other computing device, that is operated as a general purpose computer or a special purpose hardware device solely used for serving as a client 210 in the production system 200.

Generally, the plan participants 135 or their dependents/ agents (140, 145) operate the clients 210. In various embodiments, the client computer 210 includes client applications 215, 215', 215", generally 215. One example of a client application 215 is a web browser application that allows the client 210 to request a web page (e.g., from the server 205) with a web page request. An example of a web page is a data file that includes computer executable or interpretable information, forms, graphics, sound, text, and/or video, that can be displayed, executed, played, processed, streamed, and/or stored and that can contain links, or pointers, to other web pages. In one embodiment, a user of the client 210 manually requests a web page from the server 205. Alternatively, the client 210 automatically makes requests with the web browser.

Examples of commercially available web browsers are Internet Explorer, offered by Microsoft Corporation of Redmond, Wash., and Netscape Navigator, offered by AOL/Time Warner of Mountain View, Calif.

A communications network 220 connects the client 210 with the server 205. The communication may take place via any media such as standard telephone lines, LAN or WAN links (e.g., T1, T3, 56 kb, X.25), broadband connections (ISDN, Frame Relay, ATM), wireless links, and so on. The network 220 can carry TCP/IP protocol communications, and HTTP/HTTPS requests made by the web browser and the connection between the client applications 215 and the server 205 can be communicated over such TCP/IP networks. The type of network is not a limitation, however, and any suitable network may be used. Typical examples of networks that can serve as the communications network 220 include a wireless or wired Ethernet-based intranet, a local or wide-area network (LAN or WAN), and/or the global communications network known as the Internet, which may accommodate many different communications media and protocols.

In some embodiments, a record keeper 110 operates a central server 205, which interacts with clients 210. In some embodiments, a third party may manage the server 205, which may include providing the hardware, communications, and service to the server 205. The server 205 can be implemented on one or more server class computers that have sufficient memory, data storage, and processing power and that run a server class operating system (e.g., SUN Solaris, Linux, Microsoft Windows 2000, or other such operating system). Other types of system hardware and software than that described here could also be used, depending on the capacity of the device and the number of users and the amount of data received. For example, the server 205 may be part of a server farm or server network, which is a logical group of one or more servers. As another example, there could be multiple servers 205 that may be associated or connected with each other, or multiple servers could operate independently, but with shared data. As is typical in large-scale systems, application software could be implemented in components, with different components running on different server computers, on the same server, on the clients 210 or some combination.

Figure 3:
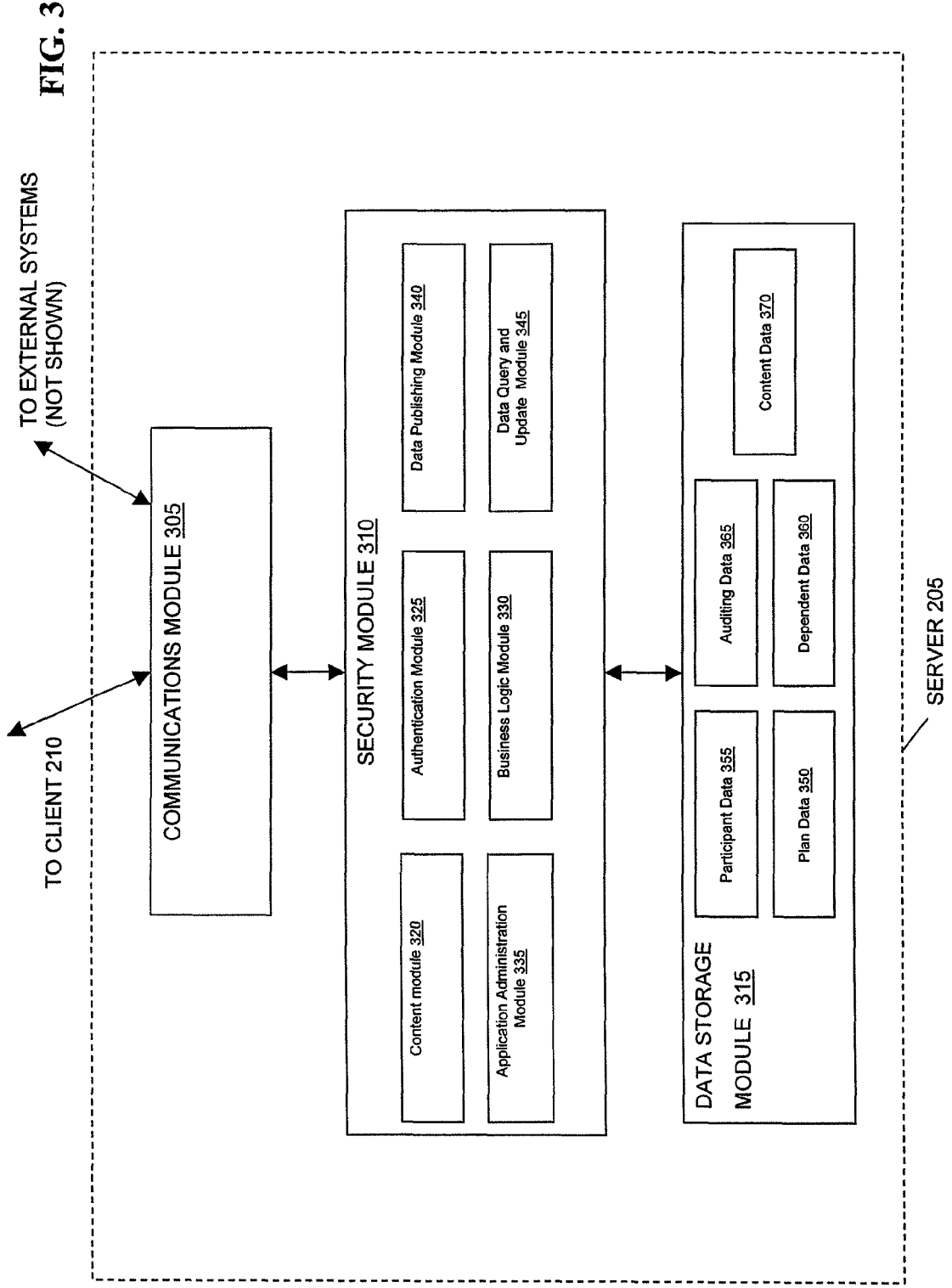
FIG. 3 illustrates a block diagram of one embodiment of a server in the system of FIG. 2 in accordance with one embodiment of the invention.

Referring to FIG. 3, in one embodiment, a server 205 includes a communication module 305, a security module 310, and a data storage module 315. The communication module 305 is the interface for communication with clients 210 and external systems (not shown) involving the transfer of files and data. In some embodiments, the communication module 305, such as a web server, is the interface for communication with clients 210 involving HTTP/S requests and responses, Java messages, SMTP messages, POP3 messages, instant messages, as well as other electronic messages. In some instances, messages may be transferred from the client 210 to the server 205, from the server 205 to the client 210, or both. The communication module 305 can be implemented as software running on one or more servers 205, or may be implemented as a stand-alone server 205. In some embodiments, the communication module 305 can provide an interface to client applications 215, so that, for example, a user can send and receive e-mail, instant messages, HTML files, and so forth.

In instances where the client 210 is being operated by a participant 135 communications received by the communications module 305 may include instructions to grant another person, such as a dependent or agent who is not yet identified in the server, access to a subset of the personal information attributed to the participant 135. Examples of personal information to which the dependent may be granted access to include financial information, beneficiary information, or healthcare information.

Once communications from the client 210 have been received, the communication module 305 communicates with the security module 310, which provides the main programming logic for the operation of the system 200. In one embodiment, the security module 310 is implemented as one or more application server programs (e.g., Internet Information Server from Microsoft Corporation, WebSphere from International Business Machines Corporation, or other such applications) running on a server class computer 205, which may be the same or different computer as the communication module 305. The security module 310 receives data from the participant 135 via a client 210 and the communication module 305 regarding access privileges of a dependent to personal information of the participant 135. The security module 310 may also receive requests for data stored in a data storage module 315 (such as lists of available plans, definitions, user accounts, etc.) from participants 135 or dependents via a client 210 and the communication module 305. The data contained within the data storage modules 315 may also be used by the security module 310 to facilitate the administration of one or more employee benefit programs. The employee benefit programs may be human resources programs, defined contribution programs, defined benefits programs, workplace savings programs, medical savings programs, payroll programs, or any combinations thereof.

The security module 310 includes several functional submodules to complete transactions between clients 210 and the system 200, including: a content module 320 for assembling and displaying information, an authentication module 325 for managing user authentication and access, a business logic module 330 for determining a subset of the personal information to which the dependent(s) or agent(s) will have access, an application administration module 335 for managing application procedures and logic, a data publishing module 340 for pushing data via the communication module 305 to external systems or clients 210, and a data querying and update module 345 for requesting, receiving, and updating data in the data storage module 315.

In some embodiments, the content module 320 reads static HTML stored in files on the security server 310. In other embodiments it requests data (via the data query and update module 345) from a data storage module 315 and combines the data with static content on the file system or within the data storage module 315 to produce completed HTML pages, which in turn are sent to the client 210 via the communication module 305. The HTML pages may, in some cases, include data or text directed to a specific user, regarding a specific plan, or other context dependent data. In some embodiments, the compilation of HTML code uses the Active Server Page ("ASP") technology from Microsoft Corporation of Redmond, Wash. to combine static HTML and data or context specific data into one or more HTML pages prior to being sent to the client 210. In some embodiments, JAVA, JavaScript, XML, or other like programming languages can be used to generate HTML code or present data, text and/or graphics to a user. In one embodiment, the HTML pages include forms, which are presented to a user on the client 210. The forms allow the user to input data, select from a series of options, and provide other responses to text or directions presented on the page.

The authentication module 325 of the security module 310 authenticates and confirms the identity of the users. The authentication module receives user authentication information from the client 210. This user authentication information may be a username, a password, a social security number, an employee number, a client number, biometric information or any combination thereof. Typically, the client 210 provides credentials to the communication module 305, which are then passed to the authentication module 325. The authentication module 325 then may check the credentials against, but not limited to, any of the following: a Lightweight Directory Access Protocol directory, a Unix password file, or a custom-built user database. If the client's 210 credentials are accepted as valid, the client is considered "authenticated" and the communication module 305 may allow the client access, via the pages provided by content module 320, to personal information stored on the data storage modules 315. If the client's 210 credentials are not accepted as valid, he or she may be prompted to present the credentials again or the client 210 may be redirected to a "forgotten password" page. Alternatively, the client 210 may be locked out of accessing the server 205 for a predetermined time or until he or she calls a customer service representative to reset his or her password.

The business logic module 330 of the security module 310 processes the rules restricting a dependent's access to a participant's personal information stored in the data storage modules 315. Each time the dependent accesses his or her account, the business logic module validates the dependent's eligibility for access to the participant's personal information. An exemplary rule to manage or determine dependent eligibility is allowing a dependent child, upon reaching the "working age" set by state child labor laws, to begin contributing to a 401(k) opened in his or her name. Validating eligibility each time the dependent accesses their account allows the business logic module 330 to provide or restrict functionality related to the participant's personal information for each session. The restrictions placed on the personal information may be based on date restrictions applied to the personal information or, alternatively, based on data type restrictions applied to the personal information.

An exemplary date restriction may be not allowing the minor to view the 401(k) savings contributions until he or she has reached the minimum legal employable age in his or her state. Consider the day before the minor's sixteenth birthday. Being a under the working age, the business logic module 330 will not allow the dependent access to the 401(k) savings plan because they do not meet the eligibility requirements set forth by the access restrictions, and thus cannot make contributions to the plan. On the day of his or her sixteenth birthday, as the dependent accesses the system, the business logic module 330 validates the dependent's eligibility and determines that the dependent is now able to access the 401(k) savings plan information. Alternatively, a dependent may lose access to certain functionality because a certain date has passed e.g., the dependent has reached age 19 and can no longer be considered a dependent (as is the case with Military Dependency and Indemnity Compensation (DIC) if the dependent is not a student).

Whereas date restrictions operate as temporal constraints, a data type restriction may preclude anyone other than the plan participant from viewing specific types of data, e.g., contributions to a personal stock purchasing plan. The data type restrictions may also be based on the relationship between the participant and the dependent/agent. Additionally, in some embodiments, operative restrictions may be provided, which define the functions within the business logic module 330 that are available to the dependent/agent. As with data type restrictions, these operative restrictions may also be based on the relationship between the participant and the dependent/agent. Examples of operative instructions, for example, may include not allowing an attorney to view a participant's 401(k) contributions or a stockbroker to view the participant's 135 outstanding medical claims because in both scenarios the access requested by the agent is not appropriate given the duties they would generally perform. In some cases, however (such as an invalid or minor child) agents or attorneys may be given fully access through legal proceedings, testamentary documents, or other means. Combinations of the various types of the data restrictions may be employed to facilitate more comprehensive business rules or certain statutory requirements such as the Health Insurance Portability and Accountability Act of 1996 (HIPAA).

The data publishing module 340 of the security module provides the data stored within the data storage module 315 to external applications. In one version of the embodiment, the data publishing module 340 provides access to, or publishes, the stored data using web services. The Web services provide the data in an XML format available via HTTP requests, email requests, or as one or more data feeds placed in a repository such as a File Transfer Protocol (FTP) server. Other versions contemplate more traditional feed methods such as comma or tab delimited text formats also which may be made available, through web services, email, and/or FTP.

The data query and update module 345 allows the security server 310 to request and update information from the data storage module 315. The data query and update module 345 may be an ODBC driver (where the security server 205 is implemented using an application server by Microsoft) or a JDBC driver (where the security server is implemented using Java technologies) for communicating with a data storage module 315 as described below. Alternatively, the data query and update module 345 may include a messaging layer which abstracts the underlying database, exposing a generic querying and updating structure to the security module 310. Additionally, a transactional queuing system, such as MSMQ (Microsoft Message Queuing) may provide for asynchronous interfacing capabilities to a backend data store. Those skilled in the art can implement best practices such as connection pooling, session persistence, and database load balancing when implementing the data query and update module 345 and such implementations are contemplated within the spirit of the invention.

As stated previously, the server 205 also includes a data storage module 315 for storing data related to the plan participant 135 and any dependents 140, 145 or agents of the participant. For instance, the data storage module 315 may store data relating to attributes of the plans 350, participant data 355 such as the personal information described above, dependent data 360, auditing data 365 such as server availability and web traffic information, and stored content 370 for the content module 320. Upon request, the data storage module 315 also provides data to the security module 310 and manages data updates as instructed by the security module 310. Additionally, the data storage module 315 holds information, such as participant information, dependant information, and auditing information as described above that the data publishing module 340 makes accessible to external systems. Examples of the data storage module 315 include the MySQL Database Server by MySQL AB of Uppsala, Sweden, the SQLServer database system of Microsoft Corporation of Redmond Wash., and the Oracle Database Server offered by Oracle Corporation of Redwood Shores, Calif.

Figure 4:
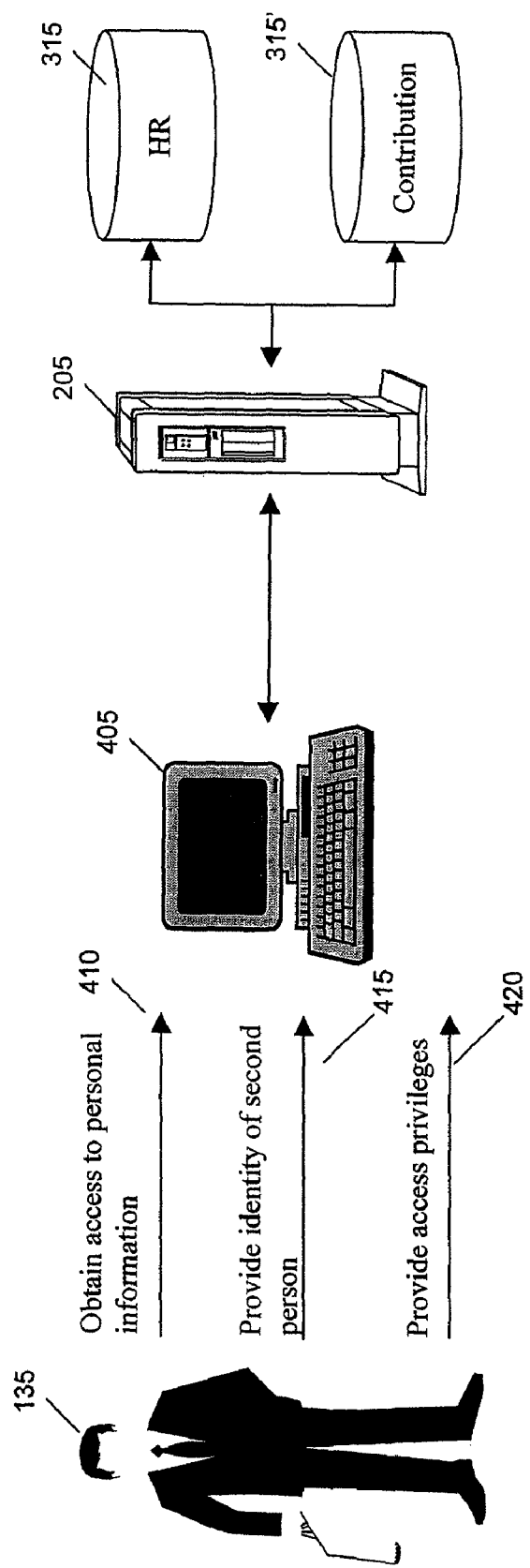
FIG. 4 depicts a server receiving dependent access information from a plan participant.

FIG. 4 depicts a plan participant 135 providing the server 205 with parameters that will grant a dependent access to the participant's otherwise personal information. In this illustration, the participant 135, via a software application residing on a terminal device 405 and/or the server 205, obtains access to his own personal information 410. In some embodiments, the software application resides on the terminal 405, retrieving only personal information data from the server, using business logic on the terminal 405 to create the display presented to the participant 135 (or other user as is the case of a dependent login). In some embodiments, the software application instead resides on the server 205 whereby the display assembly occurs on the server 205 and the terminal 405 acts only as a "dumb" terminal, i.e., displaying all data the server 205 sends to it with no business logic module 330 of its own. In some embodiments, the application resides on both the server 205 and the terminal 405 whereby the terminal caches data and pages and checks the server periodically for changes to the data it has cached. Again, the personal information may be financial information, beneficiary information, or healthcare information. The participant 135 initially provides the personal information by communicating via the software application, with the server 205. In some embodiments, before a session is established, the participant 135 authenticates himself with the server 205 as described below.

The participant 135, during the session, requests his personal information from the server 205. The server 205 then processes auditing rules to record which user is attempting to access the user's personal information at the time of access, as well as other transactional data such as session logging or persistence. Additionally, the server 205 may process rules determining if the participant 135 has the proper authority to access to his information. Typically a participant 135 accessing his own information will not be limited to what data he can access, however, this step becomes pertinent when a dependent or agent is requesting access. After processing the appropriate rules (e.g., auditing, access limitations, etc.) the server 205 establishes a connection to the data storage modules, e.g., a Human Resources database 315 and/or contribution database 315' (together 315), containing the personal information. The data storage modules 315 may in turn process rules such as auditing and access restrictions, and, if the return of the personal information is allowed, they send the data to the server 205. The server 205 then returns the personal information to the participant 135.

Once the participant 135 has obtained access 410, the participant provides 415 the server 205, via the software application, with the identity of a second person, that person being a dependent or agent of the participant, having some benefits relationship to the participant, who has not been previously identified as a use of the system. The participant 135 can provide the identity 415 through several customer service channels. In some embodiments, the participant 135 fills out an HTML form (or other means of interaction such as an ActiveX component or Java applet) on the website indicating the second person's first and last name, his or her relationship to the participant 135, and other identification data such as a social security number, date of birth, and/or address. In some embodiments, only the second person's social security number is necessary. One skilled in the art would understand that any single piece of information or combination of information that would generally uniquely indicate the identity of a person would be applicable when providing 415 the server 205 with the second person's identity. Another channel through which the participant 135 may provide the identity 415 of the second person is a telephonic communication with the participant 135. The participant 135 may provide 415 the dependent/agent's identity through an interactive voice menu or to a customer service representative. The identity information may also be provided 415 through a combination of methods including email or an online chat service. In some embodiments, providing the second person's identity 415 establishes the second person as a user in the system. By establishing the second person as a user in the system, the system creates a personal page for the second person as a starting page when he or she accesses the system. In these embodiments, the personal page is accessible in the same manner as the page that the participant 135 uses to access his or her own personal information, e.g., by providing authentication information such as a username and password or PIN. Additionally, functionality allowing the dependent to change their password/PIN or to retrieve it from the system is provided. It should be noted that though the participant 135 is providing the identity 415 information of the second person, in some embodiments, the sponsoring participant 135 is restricted from using the new dependent login credentials to log in as the dependent. This is to prevent the participant 135 from "pretending" to be the dependent and logging in using the dependent's information. In some embodiments, preventing the participant 135 from pretending to be the dependent includes sending an email to the dependent's email address to activate the login. In some embodiment this can include sending the dependent a PIN in a postal mailing to unlock the login.

Because the participant 135 is responsible for providing the dependent information 415 verification and reconciliation, the dependent data may be unreliable. The participant 135 may have incorrect information, may not know certain information, or intentionally or unintentionally enter incorrect information. One exception is when the system identifies the dependent as a participant already identified to the system. In this scenario, the system leverages the dependent's existing account to define which functionality, outside of dependent functions, are available to the dependent and verifies information provided by the sponsor participant 135.

There are several scenarios where dependents are also participants in the system. One example is where a husband and wife both work for the same company, each having enrolled individually in a health or benefits plan before they were married. In this scenario, the system is able to correlate the dependent records to a pre-existing participant 135 record. In effect, the system is able to determine that the dependent wife of John Doe 135 is in fact Jane Doe 140, a participant herself. An exemplary method of correlating the two is by having a foreign key relationship between the social security number in a dependent table and the social security number in a participant table. In these embodiments, the system also maintains a relationship between the dependent to the sponsoring participant 135, e.g., the husband may still be the sponsor participant of his wife, even if she is also identified as a participant in the system. Consequently, any children of the husband and wife are considered dependents of both participants. In embodiments where the dependent is also a participant 135, once his or her identity information is provided 415 to the system, additional information necessary to create a user in the system may not need to be provided, as it already existed when the dependent was first identified to the system as a participant 135. Instead, a notification of an additional dependent status is communicated to the dependent. In some embodiments, this notification is an email sent to the dependent. In other embodiments, the notification is a letter sent via postal mail.

After providing the second person's identity 415, the participant provides 420 parameters defining the dependent/agent's access privileges to the participant's personal information. As stated above, the participant 135 provides the server 205 with information by establishing communications via the software application that resides on the terminal 405 and/or on the server 205. In addition to providing access privileges 420, the relationship between the participant 135 and the dependent/agent may also be provided by the participant 135 via the software application. The relationship may, in some cases, be used to define the access privileges granted to the dependent.

Beneficially, the participant may also provide parameters, after the initial parameters are provided 420, which modify or revoke the dependent/agent's access privileges to the personal information. Such functionality is useful when the relationship between the participant 135 and the dependent/agent changes. For example, when a participant 135 changes financial advisors, the former financial advisor should no longer have access to the participant's 135 retirement account information. The invention therefore allows the participant 135 to revoke the former financial advisor's access to his personal information and grant that same access to a new financial advisor. Additionally, access privileges may be modified to allow more or less access to the participant's 135 personal information. For example, the participant 135 may not feel comfortable allowing his new financial advisor access to all of his retirement accounts. As the participant 135 gains confidence in the new financial advisor, he may wish to modify the advisor's access. At first, the advisor may only be able to access only the participant's 401(k) information. Eventually, as the advisor proves himself competent, the participant 135 may modify the advisor's access such that the advisor may access all of the participant's 135 retirement accounts.

Figure 5:
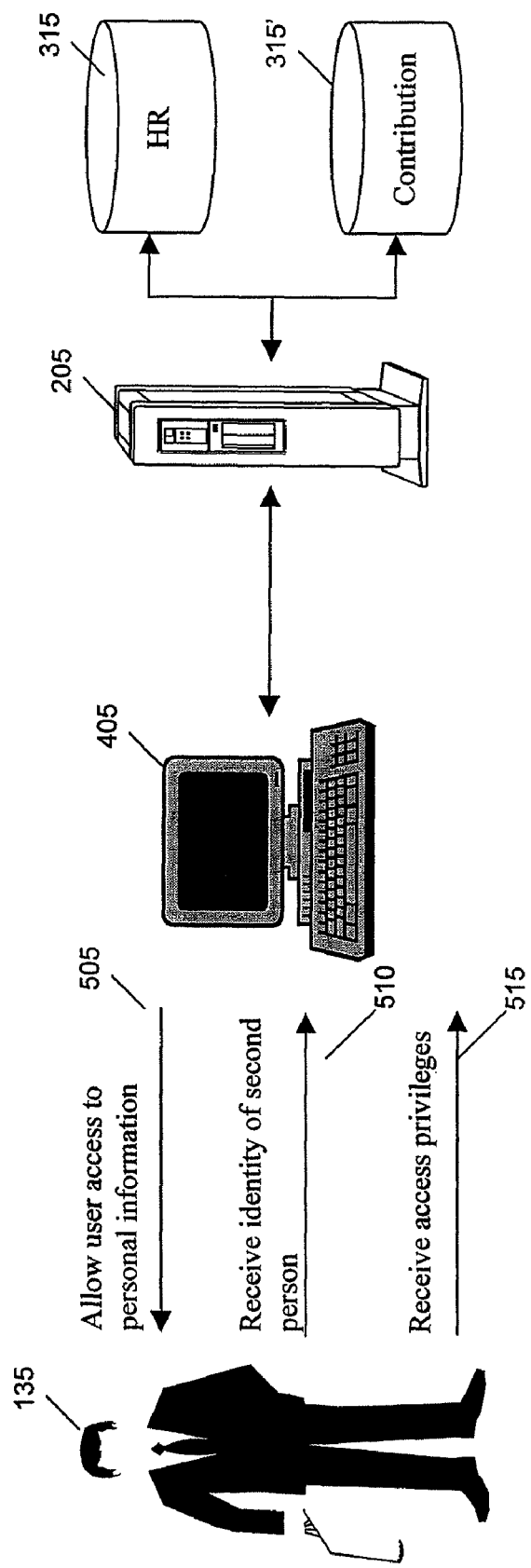
FIG. 5 depicts a plan participant providing the server with dependent access information.

FIG. 5 depicts a server 205 receiving instructions from a plan participant 135 granting a dependent access to his otherwise personal information. The server 205 allows a participant 135 access by receiving, via a software application hosted on the server 205, or optionally on a terminal 405, authentication information from the participant as described above. In exemplary scenario, the server 205 presents the participant 135 with an interface (via the content 320 and communications 305 modules), the interface having a series of identifying characteristics such as questions or user input fields. The participant 135 then provides answers or input (authentication information) which, singly or in combination, uniquely identifies him as an authenticated user in the system. The authentication information is then verified by the server 205, through an authentication module 325 as is described above, and the participant 135 is allowed access to personal information 505 stored in a data storage module such as an Human Resources 315 or contribution 315' database.

Once the participant 135 is allowed access, the server receives the identity of a second person 510 from the participant 135, where the second person is a dependent or agent of the participant 135 and previously unknown to the system. The server 205 may receive 510 the identity of the dependent/agent through several channels, as described above.

After the server 205 receives the dependent/agent's identity 510, parameters defining the dependent/agent's access privileges to the participant's personal information are received 515. The server 205 receives the dependent/agent's privileges much in the same manner as the participant 135 was authenticated: the participant responds to a series of questions or input fields provided by the server 205, via the software application. In addition to receiving the access privileges 515, in some embodiments of the aspect, the relationship between the participant and the dependent/agent is also received via the software application, and that relationship defines, at least in part, the access privileges of the dependent/agent. Beneficially, the server may also receive parameters, after the initial parameters are received 515, which modify or revoke the dependent/agent's access privileges to the personal information to reflect changes in the participant/dependent relationship.

Figure 6:
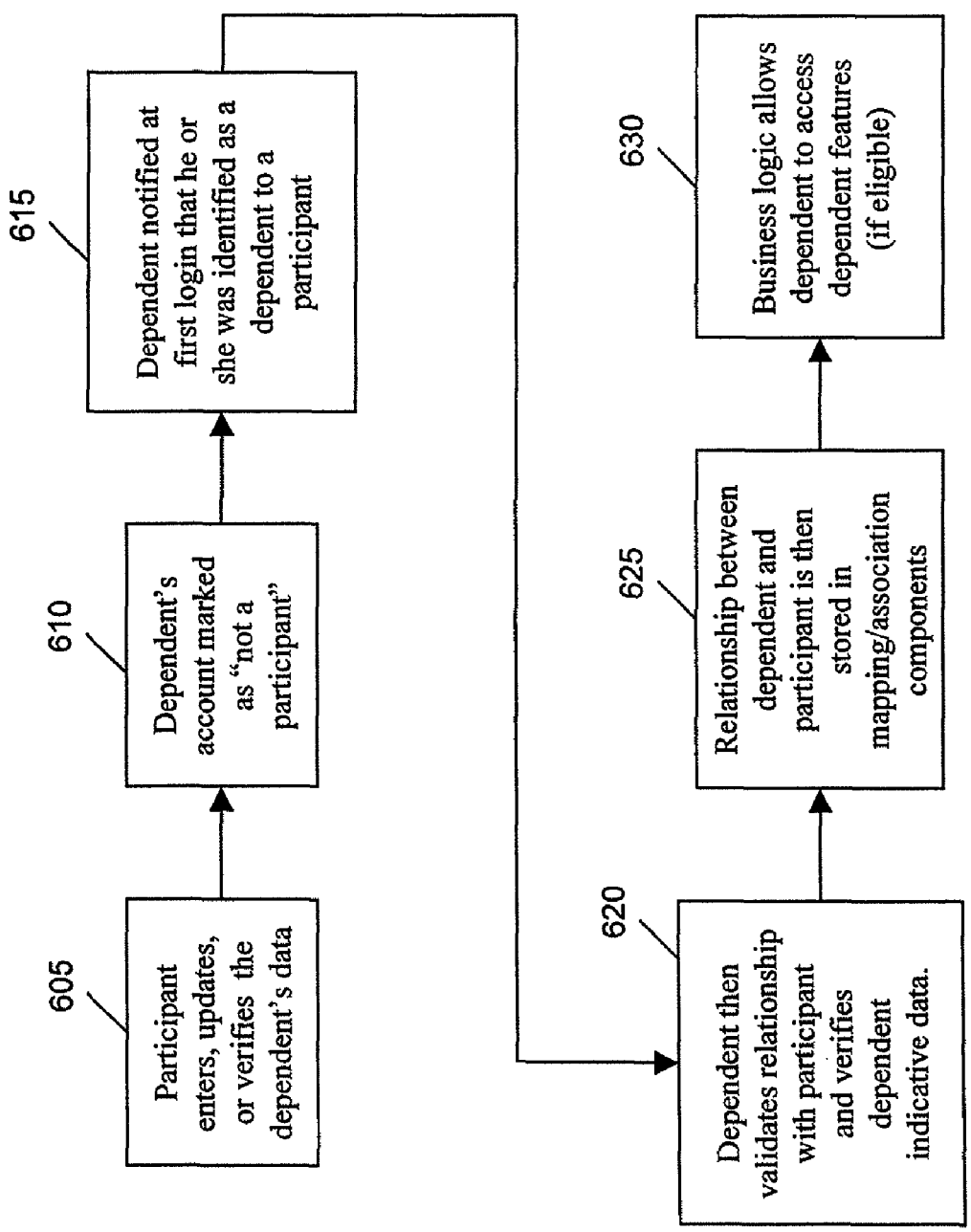
FIG. 6 depicts a flowchart illustrating processing actions the system performs in some embodiments of the invention.

FIG. 6 depicts a flowchart illustrating processing actions the system performs in some embodiments of the invention. The participant 135 begins by entering, updating, or verifying the dependent's data 605. The dependent's account records are marked as "not a participant" 610. In some embodiments the records are marked by setting a Boolean value in a storage module 315. The dependent is notified 615 at his or her first login that he or she was identified as a dependent to a participant 135. This notification may be displayed as an interstitial display page of the application, a pop-up window, or a dialog box using the client's 210 native windowing Application Programming Interface. The dependent then validates his or her relationship 125 with the participant 135 and verifies dependent indicative data 620. Validation and verification both typically involve submitting HTML forms including data analogous to that provided by the participant 135 or approving of a generated page containing the information provided by the participant 135. The relationship between dependent and participant is then stored 625 in mapping/association components such as the participant data sub-module 355 or the dependent data sub-module 360 in the data storage modules 315. The business logic module 330 then allows 630 the dependent to access dependent features (if eligible).

FIG. 7 depicts a screen of an HR portal 700 where dependent information is displayed to a user through a web browser interface presented in HTML. The interface displays information for the participant's 135 two dependents (his wife, Jane 140, and his child, John Jr. 145) and displays their information such as social security number 705, relationship 125, date of birth 710 and address 715. An Update link 720 is provided, allowing the participant 135 to modify dependent identification data, as well as the parameters that determine the data the dependent has access to and any other data restrictions. Additionally, links are provided to the left that allow the participant 135 to perform various processing actions. These links are only exemplary and one skilled in the art is able to provide relevant portal information that may or may not include sections analogous to the following. In this particular embodiment, links for the participant's healthcare benefits 725 are provided. The links include: the ability to check what is new to the healthcare portion of the site, management of current benefits, and a section devoted to reimbursement plans for healthcare. Below the healthcare links 725, an area devoted to the participant's 135 personal information is presented. Here, the participant 135 can access his or her personal information 730 or that of, or a subset of, his or her dependent's personal information. Beneficially, links to forms 735 and a reference library 735' are provided to the participant 135 as "Health Resources," thus consolidating different areas of healthcare management into a central HR management portal 700.

The invention may be embodied in other specific forms without departing from the spirit or essential characteristics thereof. The foregoing embodiments are to be considered in all respects illustrative of the invention rather than limiting.

What is claimed is:

1. A method for establishing a person as a user in a system associated with an employer-offered benefit comprising:

generating, by a first computing device, a first account for an employee, the first account being associated with an employer-offered benefit;

receiving, at the first computing device from a second computing device associated with the employee, first one or more credentials to authenticate the employee, the first one or more credentials being associated with the employee and the first account;

receiving, at the first computing device from the second computing device, identity information associated with a person to be established as a user in the system and a relationship between the employee and the person to be established, wherein the person to be established is eligible to receive services under the employer-offered benefit;

generating, by the first computing device, a second account for the person to be established, the second account including the identity information and the relationship, being associated with the services under the employer-offered benefit, being in the name of the person to be established, and being independent from the first account;

initiating, by the first computing device, transmission of a message including second one or more credentials for activating the second account to the person to be established, the transmission using a communication channel that is specific to the person to be established;

receiving, by the first computing device after the second account is activated, service-specific dependent information from a third computing device associated with the person to be established; and updating, by the first computing device, information associated with the employer-offered benefit services available to the second account using the service-specific dependent information received from the third computing device.

2. The method of claim 1 wherein the communication channel is a postal mailing addressed to the person to be established.

3. The method of claim 1 wherein the communication channel is an email address of the person to be established.

4. The method of claim 1 wherein the second one or more credentials includes at least one of a password or a personal identification number (PIN).

5. The method of claim 1 further comprising allowing the person to be established to retrieve the second one or more credentials.

6. The method of claim 1 wherein the identity information is received through a customer service channel.

7. The method of claim 6 wherein the customer service channel is selected from a group comprising a form on a website, an ActiveX component, and a Java applet.

8. The method of claim 1 wherein the identity information is obtained via a telephonic communication from the employee, wherein the telephonic communication is oral, digital, or both.

9. The method of claim 8 wherein the telephonic communication is selected from a group comprising an interactive voice menu and a customer service representative.

10. The method of claim 1 wherein the identity information is received via an email message from the employee, an online chat message from the employee, or a combination thereof.

11. The method of claim 1 wherein the identity information includes a first name, last name, relationship of the person to be established to the employee, a Social Security number, a date of birth, a mailing address, or any combination thereof.

12. The method of claim 1 further comprising correlating a record of the person to be established with a record of a user in the system.

13. The method of claim 12 wherein the correlating comprises having a foreign key relationship between the record of the person to be established and the record of the user.

14. The method of claim 12 wherein the record of the person to be established is a Social Security number in a first data store and the record of the user is a Social Security number in a second data store.

15. The method of claim 12 wherein the person to be established as a user in the system is a non-employee.

16. The method of claim 12 wherein the communication channel that is specific to the person to be established is different from the communication channel of the employee.

17. A system for establishing a person as a user in a system associated with an employer-offered benefit, the system comprising:

a first computing device configured to:
generate a first account for an employee, the first account being associated with an employer-offered benefit;

receive, from a second computing device, first one or more credentials to authenticate the employee, the first one or more credentials being associated with the employee and the first account;

receive, from the second computing device, identity information associated with a person to be established as a user in the system and a relationship between the employee and the person to be established, wherein the person to be established is eligible to receive services under the employer-offered benefit;

generate a second account for the person to be established, the second account including the identity information and the relationship, being associated with the services under the employer-offered benefit, being in the name of the person to be established, and being independent from the first account;

initiate transmission of a message including second one or more credentials for activating the second account to the person to be established, the transmission using a communication channel that is specific to the person to be established;

receive, after the second account is activated, service-specific dependent information associated with the person to be established from a third computing device; and update information associated with the employer-offered benefit services available to the second account using the service-specific dependent information received from the third computing device.

18. A computer program product, tangibly embodied in a non-transitory computer-readable storage medium, for establishing a person as a user in a system associated with an employer-offered benefit, the computer program product including computer-executable instructions operable to cause a computing device to:

generate a first account for an employee, the first account being associated with an employer-offered benefit;

receive, from a second computing device, first one or more credentials to authenticate the employee, the first one or more credentials being associated with the employee and the first account;

receive, from the second computing device, identity information associated with a person to be established as a user in the system and a relationship between the employee and the person to be established, wherein the person to be established is eligible to receive services under the employer-offered benefit;

generate a second account for the person to be established, the second account including the identity information and the relationship, being associated with the services under the employer-offered benefit, being in the name of the person to be established, and being independent from the first account;

initiate transmission of a message including second one or more credentials for activating the second account to the person to be established, the transmission using a communication channel that is specific to the person to be established;

receive, after the second account is activated, service-specific dependent information associated with the person to be established from a third computing device; and update information associated with the employer-offered benefit services available to the second account using the service-specific dependent information received from the third computing device.

* * * * *